United States Patent [19]
White et al.

[11] Patent Number: 5,230,489
[45] Date of Patent: Jul. 27, 1993

[54] WIRE RETENTION CLIP

[75] Inventors: Fred E. White, Marietta; Barry O. Page, Woodstock; Joseph A. Dukes, Dawsonville, all of Ga.

[73] Assignee: Panduit Corp., Tinley Park, Ill.

[21] Appl. No.: 925,359

[22] Filed: Aug. 3, 1992

[51] Int. Cl.⁵ ............................................. F16L 3/08
[52] U.S. Cl. ............................. 248/74.2; 24/16 PB; 24/543; 248/73
[58] Field of Search ............. 248/73, 74.3, 74.4, 248/74.2; 24/16 PB, 17 AP, 297, 625, 626, 627, 543

[56] References Cited

U.S. PATENT DOCUMENTS

| | | |
|---|---|---|
| 3,432,129 | 3/1969 | Santucci . |
| 3,516,631 | 6/1970 | Santucci . |
| 3,637,177 | 1/1972 | Santucci . |
| 3,982,307 | 9/1976 | Smith ...................... 24/543 |
| 4,153,228 | 5/1979 | Delserro ............... 248/74.3 |
| 4,317,262 | 3/1982 | Wells, Jr. . |
| 4,325,526 | 4/1982 | Kitagawa ........... 248/74.3 X |
| 4,386,752 | 6/1983 | Pavlak ................... 24/543 |
| 4,439,896 | 4/1984 | Matsui . |
| 4,564,163 | 1/1986 | Barnett . |
| 4,609,171 | 9/1986 | Matsui . |
| 4,635,886 | 1/1987 | Santucci et al. . |
| 4,779,828 | 10/1988 | Munch ............... 24/16 PB X |
| 5,040,752 | 8/1991 | Morrison . |

FOREIGN PATENT DOCUMENTS

| | | | |
|---|---|---|---|
| 2442414 | 3/1976 | Fed. Rep. of Germany ..... 248/74.3 |
| 1391809 | 4/1975 | United Kingdom ............... 248/74.3 |
| 1567852 | 5/1980 | United Kingdom ............. 24/16 PB |

*Primary Examiner*—J. Franklin Foss
*Attorney, Agent, or Firm*—Charles R. Wentzel; Mark D. Hilliard; Robert A. McCann

[57] ABSTRACT

A wire retention clip for holding a wire or bundle of sires. The wire clip includes a retaining arm member and locking means attached to a base plate in a spaced relationship to each other. The retaining arm member includes a substantially tangentially extending press pad that extends in a direction towards the free end of the retaining arm, to ease the pressing of the free end of the retaining arm into the locked position and to cover the release lever of the locking mechanism to prevent inadvertent release of the retaining arm. The retaining arm member is further defined by its ends both tapering into a narrower middle section.

7 Claims, 2 Drawing Sheets

WIRE RETENTION CLIP

TECHNICAL FIELD

The present invention relates generally to a latching wire clip for holding wires and cables having a flexible arm and a locking mechanism, situated on a base, wherein the flexible arm portion forms a loop when a free end of the arm is inserted into the locking mechanism, and more particularly to an easier to use integrally molded wire retention clip having a releasable locking mechanism, a comfortable press pad and means for preventing inadvertent release.

BACKGROUND OF THE INVENTION

Latching wire clips for retaining bundles of wires and cables are widely used in the electrical industry. U.S. Pat. Nos. 3,516,631; 3,637,177; 4,564,163; and 5,040,752 are examples of wire clips having a locking mechanism and an arm that forms a loop for retaining wire or wires. It is important to have a strong arm and locking mechanism to properly retain the wires under the normal stresses to which the clip will be subjected. In locking wire clips of this type there is usually required an uncomfortable pressing with the thumb or fingers on a small or edged surface. It is also frequently necessary to allow for the release and relocking of wires from the retaining clip which is often difficult to accomplish with the prior art devices. It is however, very important to avoid inadvertent releasing of the locking mechanism and subsequent failure in retaining of the wire or wires.

SUMMARY OF THE INVENTION

It is therefore an object of the present invention to provide a wire clip that features a larger finger pad to create a more comfortable point of application of pressure for locking the wire clip. It is another object of the present invention to provide a wire clip that helps prevent inadvertent release of the locked clip. It is still a further object of the invention to make a wire clip that has greater flexibility for locking and releasing but maintains its strength for holding the wires or cables.

In general, a wire clip includes a base having a top and a bottom, a retaining arm having a free end and an opposite mounted end attached to the top of the base wherein the retaining arm has sufficient flexibility to bend so that the free end can touch the top of the base at a spaced distance from the mounted end to form a loop, and locking means, including a release lever, disposed on the top of the base for selectively engaging and releasing the free end of the arm, and a press pad extending from a point on the free end of the arm substantially tangential to the loop formed by the retaining arm in a locked position and oriented away from the mounted end and towards the free end of the retaining arm.

DESCRIPTION OF THE PREFERRED EMBODIMENT

Figure 1:
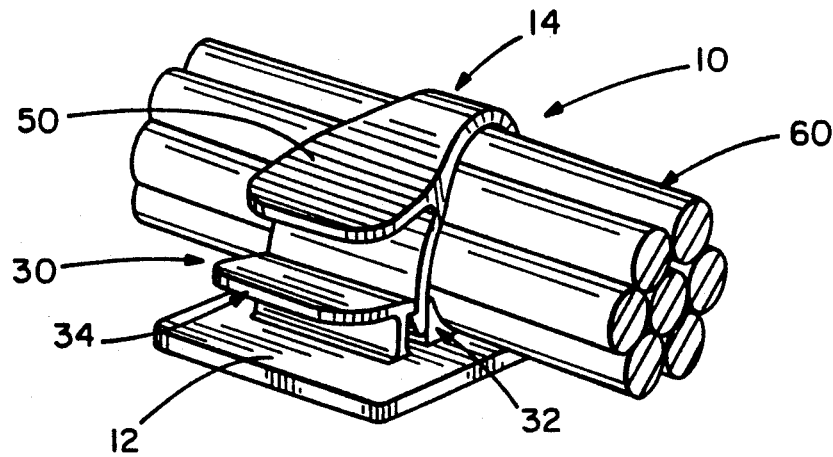
FIG. 1 is a perspective view of a wire clip in a locked position disposed around a bundle of wires embodying the concept of the present invention.
Figure 2:
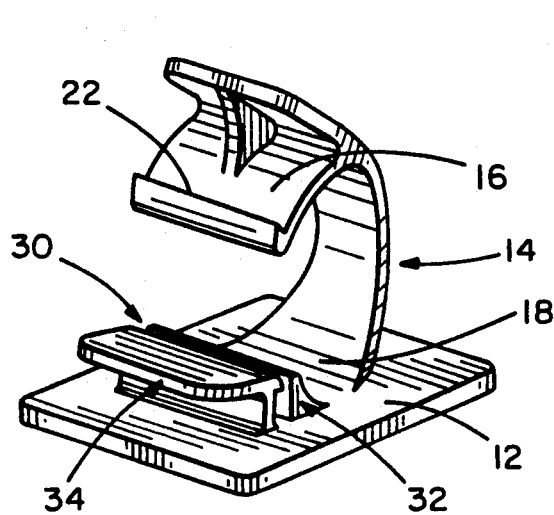
FIG. 2 is a perspective view of the wire clip of FIG. 1 in an open position.
Figure 3:
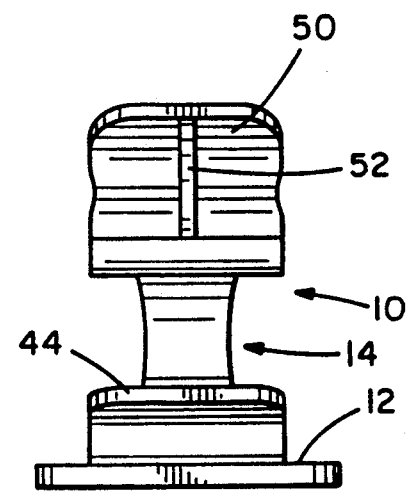
FIG. 3 is a front view of the wire clip of FIG. 2.
Figure 4:
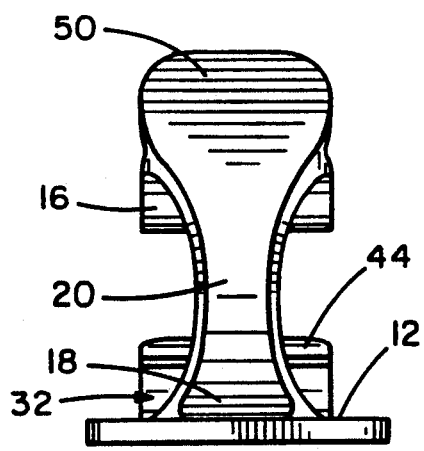
FIG. 4 is a rear view of the wire clip of FIG. 2.

A wire retention clip embodying the concept of the present invention is designated generally by the reference numeral 10 in the accompanying drawings. Wire clip 10 is integrally molded and includes a base plate 12 having a retaining arm 14 connected at one end to base plate 12. Retaining arm 14 has sufficient flexibility to allow a free end 16 of retaining arm 14 to reach base plate 12 at a spaced distance from a mounted end 18 of retaining arm 14 to form a loop. Retaining arm 14 is a striplike member that has a tapered shape wherein mounted end 18 and free end 16 are wider and both taper to a narrower middle section 20 (FIG. 4). This allows for greater flexibility of retaining arm 14 while still providing the locking strength required. As seen in FIG. 2, on the outside of free end 16 of retaining arm 14 is a lip portion 22 that extends the width of free end 16. Lip portion 22 is angled back to allow for engagement with a locking mechanism 30.

Figure 5:
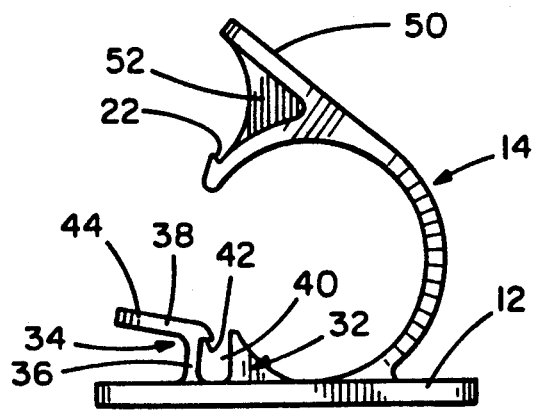
FIG. 5 is a side view of the wire clip of FIG. 2.
Figure 6:
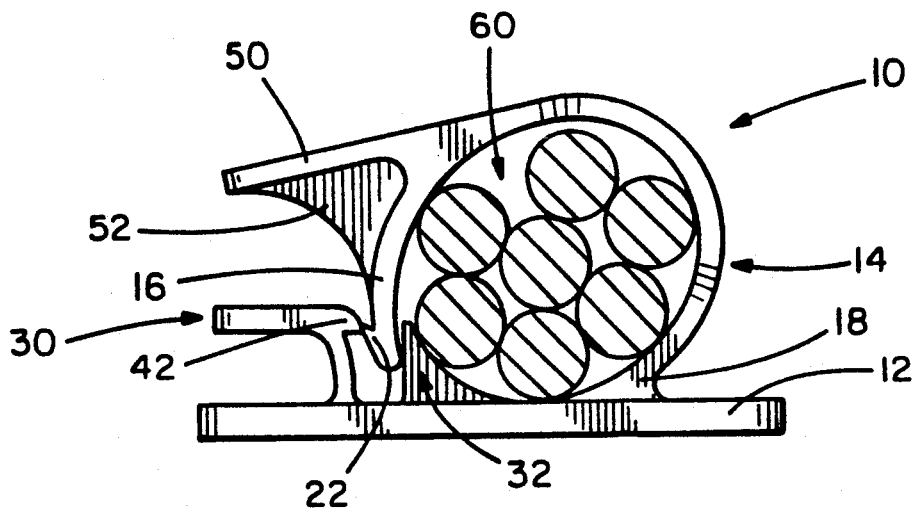
FIG. 6 is a side view of the wire clip embodying the concept of the present invention in a nearly locked position retaining a bundle of wires.

As seen in FIG. 2, locking mechanism 30 is attached to base plate 12 at a spaced distance from mounted end 18 of retaining arm 14. Locking mechanism 30 consists of a pair of spaced apart vertical locking members 32, 34 having a width approximately equal to that of free end 16 of retaining arm 14. First locking member 32 is closer to mounted end 18 of retaining arm 14, is rigid, and has a flat side facing second locking member 34 and an arcuate opposite side whereby the thickness becomes greater as first locking member 32 approaches base plate 12. As can be seen in FIG. 5, second locking member 34 consists of a pair of leg sections 36 and 38, first resilient leg section 36 being angled slightly from the vertical so as to lean towards first locking member 32 and situated so as to have one side facing the flat side of first locking member 32. Second leg section 38 is perpendicularly attached at the top of first leg section 36 and has one end extending slightly into a gap 40 created by the spaced apart opposing locking members 32, 34 to create a flange portion 42 and a second end which extends, at an angle slightly above horizontal, away from first locking member 32 to create a release lever 44.

Figure 7:
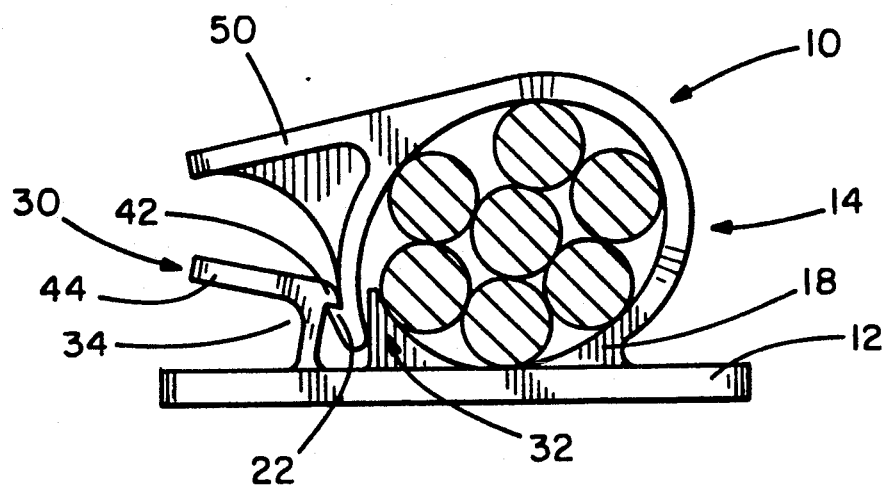
FIG. 7 is a side view of the wire clip embodying the concept of the present invention in the fully locked position retaining a bundle of wires.
Figure 8:
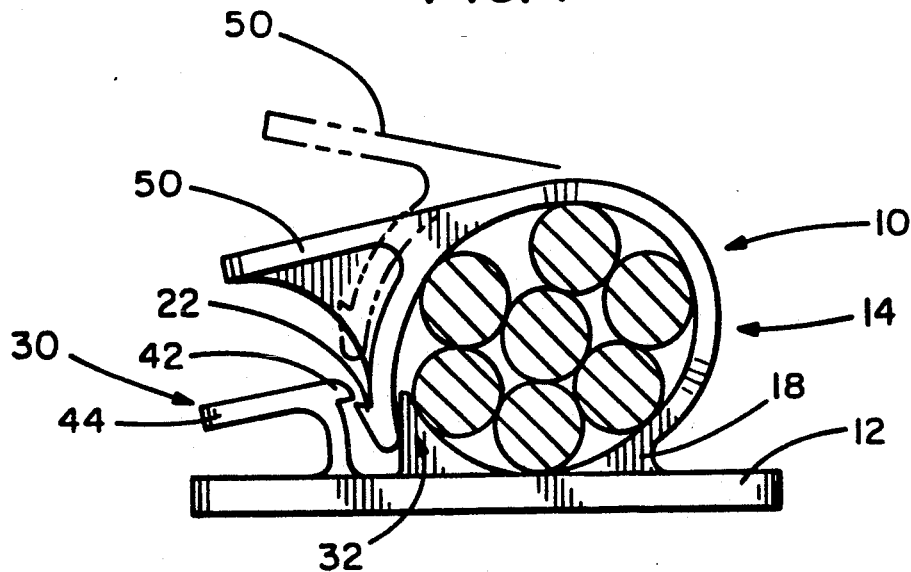
FIG. 8 is a side view of the wire clip embodying the concept of the present invention showing the releasing from the locked position retaining a bundle of wires.

As can be seen in FIG. 7, wire clip 10 is brought into the locked position surrounding a bundle of wires 60 by inserting free end 16 of retaining arm 14 into gap 40 between locking members 32, 34 by forcing down retaining arm 14 causing free end 16 to push against resilient leg section 36 until lip portion 22 passes and engages with flange portion 42. Free end 16 presses against first locking member 32 while lip portion 22 is engaged with flange portion 42 of second locking member 34. As seen in FIG. 8, in order to release wire clip 10 from the locked position, the user need only push on release lever 44 of second locking member 34 which causes the disengagement of lip portion 22 of free end 16 of retaining arm 14 from flange portion 42 of second locking member 34.

As seen in FIG. 4, there is provided a press pad 50 substantially tangentially extending from a point near free end 16 of retaining arm 14 having a width approximately equal to both end sections 16, 18 of retaining arm 14. Press pad 50 is a planar extension and has a length such that when retaining arm 14 is bent into the locked position press pad 50 covers, at a spaced distance, release lever 44 of second locking member 34 of locking mechanism 30 (FIG. 7). There is also provided a gusset plate member 52 connected perpendicularly between free end 16 of retaining arm 14 and press pad 50. Gusset plate 52 gives additional support to press pad 50. Therefore, the locking of wire clip 10 is easier as the flat press pad 50 is pushed down until lip portion 22 is inserted sufficiently into gap 40 between locking members 32, 34 of locking mechanism 30 so that lip portion 22 engages with flange portion 42 of second locking member 34 (FIG. 7). The size, shape and orientation of press pad 50 allows for a comfortable pressing to lock wire clip 10.

Inadvertent releasing of retaining arm 14 from the locked position is protected against by press pad 50 which extends to cover release lever 44 thus preventing unintentional depression of release lever 44.

While the particular embodiment of the present invention has been shown and described, it will be obvious to those skilled in the art that changes and modifications may be made without departing from the invention in its broader aspects. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A wire clip, comprising:
   a base having a top and a bottom;
   a retaining arm having a free end, and an opposite mounted end attached to the top of the base wherein the retaining arm has sufficient flexibility to bend so that the free end can touch the top of the base at a spaced distance from the mounted end to form a loop;
   locking means, including a release lever, disposed on the top of the base for selectively engaging and releasing the free end of the arm; and
   a press pad extending from a point on the free end of the arm substantially tangential to the retaining arm and oriented away from the mounted end and towards the free end of the retaining arm.

2. A wire clip as set forth in claim 1, wherein the wire clip is integrally formed.

3. A wire clip as set forth in claim 2, wherein the press pad extends the width of the free end of the retaining arm and for a length far enough to cover the release lever of the locking means.

4. A wire clip as set forth in claim 2, wherein the press pad is planar and extends tangentially from the loop formed by the retaining arm in the locked position.

5. A wire clip as set forth in claim 2, wherein the press pad extends from a point on the retaining arm approximately ⅔ from the mounted end and ⅓ from the free end.

6. A wire clip as set forth in claim 2, wherein the free end of the retaining arm includes a gusset plate attached perpendicularly thereto and connected beneath the press pad for supporting the press pad.

7. A wire clip as set forth in claim 2, wherein said retaining arm has a central portion having a narrowing width tapered from both its ends.

* * * * *